US007155615B1

(12) United States Patent
Silvester

(10) Patent No.: US 7,155,615 B1
(45) Date of Patent: Dec. 26, 2006

(54) METHOD AND APPARATUS FOR PROVIDING A SECURE-PRIVATE PARTITION ON A HARD DISK DRIVE OF A COMPUTER SYSTEM VIA IDE CONTROLLER

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 09/608,117

(22) Filed: Jun. 30, 2000

(51) Int. Cl.
*H04L 9/00* (2006.01)
*H04K 1/00* (2006.01)
*G06F 12/14* (2006.01)
*G06F 12/16* (2006.01)

(52) U.S. Cl. .................. 713/185; 726/27; 711/152; 711/163

(58) Field of Classification Search ................ 713/166; 711/152, 163
See application file for complete search history.

(56) References Cited

U.S. PATENT DOCUMENTS

| 5,485,439 | A | * | 1/1996 | Hamasaka et al. ....... 369/47.36 |
| 5,623,637 | A | * | 4/1997 | Jones et al. ................. 711/164 |
| 5,713,006 | A | * | 1/1998 | Shigeeda .................... 711/170 |
| 5,754,821 | A | * | 5/1998 | Cripe et al. ................. 711/164 |
| 6,385,721 | B1 | * | 5/2002 | Puckette ........................ 713/2 |
| 6,401,183 | B1 | * | 6/2002 | Rafizadeh ................... 711/173 |

* cited by examiner

*Primary Examiner*—Nasser Moazzami
*Assistant Examiner*—Brandon Hoffman
(74) *Attorney, Agent, or Firm*—Blakely, Sokoloff, Taylor & Zafman LLP

(57) ABSTRACT

A system and method are described for providing a secure-private partition on a storage device of a computer system. The secure-private partition is normally invisible to an operating system unless the partition is unlocked. The secure-private partition is configured to unlock so that it is visible to the operating system in response to an unlock request received from a software task having knowledge about a proper handshake for unlocking the partition.

25 Claims, 4 Drawing Sheets

METHOD AND APPARATUS FOR PROVIDING A SECURE-PRIVATE PARTITION ON A HARD DISK DRIVE OF A COMPUTER SYSTEM VIA IDE CONTROLLER

BACKGROUND OF THE INVENTION

1. Field of the Invention

The present invention generally relates to computer systems, and in particular, to a method and apparatus for providing a secure-private partition on a hard disk drive.

2. Description of the Related Art

In the field of computer systems, various implementations have been proposed for protecting data stored in a computer from being accidentally or intentionally deleted or corrupted. For example, firmware functions and other codes, data, files stored in flash memory and other nonvolatile memory are protected from deliberate distortion of information. In one type of flash memory (i.e., boot block type) the codes and data can be locked and updated only in a special manner. Due to increases in complexity of computer systems, firmware functions and features within system ROM (read-only memory) utilizing flash memory (or other nonvolatile memory) continue to grow in size. This growth of firmware creates a problem of adding more functions and features without having enough memory space to store these new functions. Unfortunately, the cost of flash memory and other nonvolatile memory continues to remain relatively high. Because hard drive storage continues to get faster and cheaper, it would be desirable to create a secure partition on a hard disk drive which may serve as an expansion memory for platform expansion functions.

There is also a need to protect certain software stored in computer systems from computer viruses. Once a computer is infected with a computer virus, codes, data, files stored in a hard disk drive is vulnerable to unauthorized corruption. Therefore, there is a need to provide a secure partition on a hard disk drive that is capable of protecting the software stored in the secure partition from being accidentally or intentionally deleted or corrupted.

DETAILED DESCRIPTION OF THE INVENTION

One implementation of the present invention is described herein for purposes of illustration, namely a method and a corresponding system for providing a secure-private partition (SPP) on a storage device (e.g., hard disk drive) of a computer system. The SPP is accessible only through the use of special operations to minimize or eliminate the chance of data being accidentally or intentionally deleted or corrupted. The special operations for accessing the SPP will be discussed in detail with reference to FIGS. 2a, 2b and 3.

Figure 1:
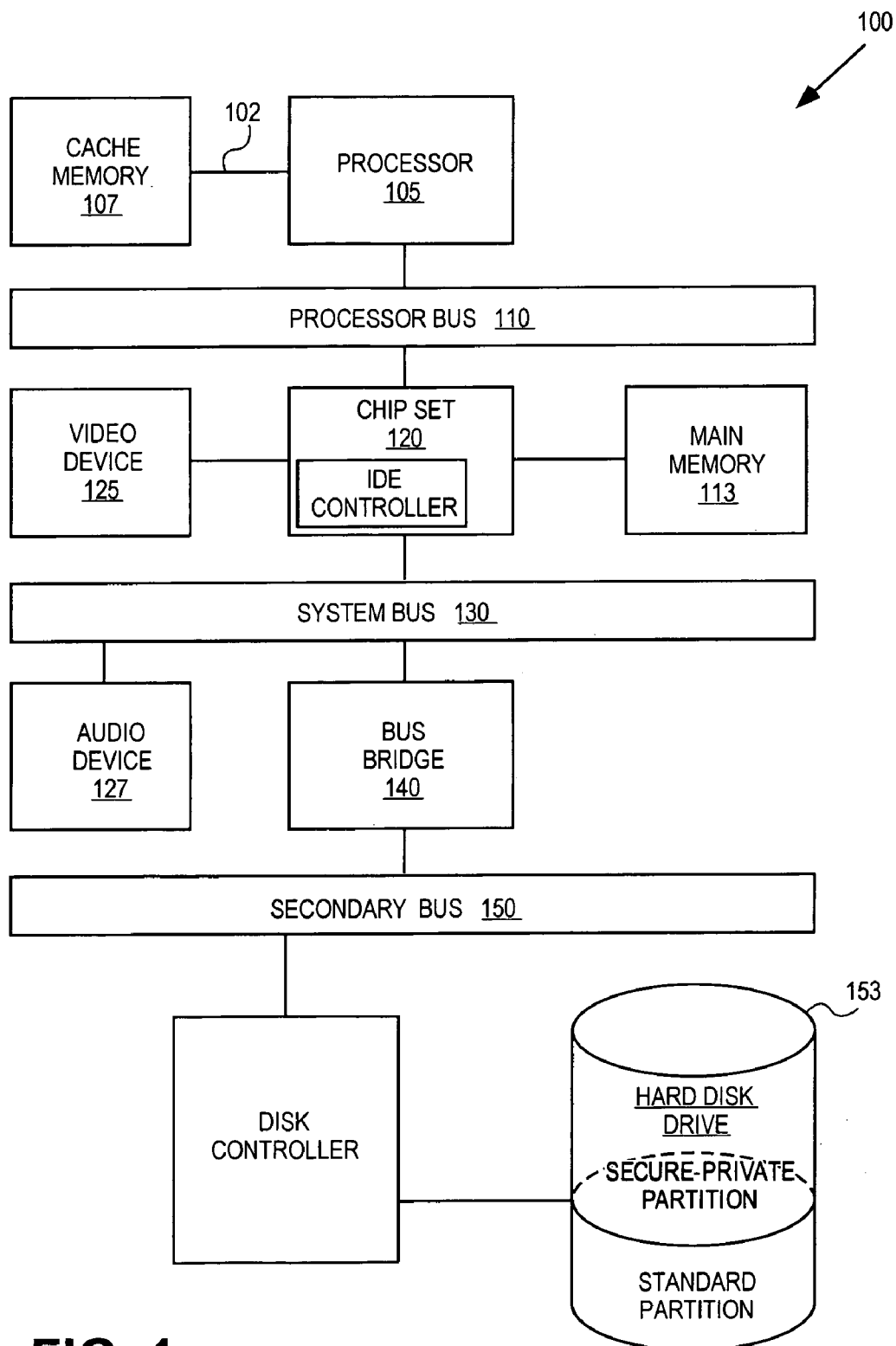
FIG. 1 is a block diagram of one embodiment of a computer system suitable for use with the present invention.

Referring to FIG. 1, one embodiment of a computer system in which a method of the present invention may be implemented. The computer system 100 includes a processor 105 coupled to a processor bus 110. In one embodiment, the processor 105 is a processor from the Pentium® family of processors including the Pentium®, Pentium® Pro, Pentium® II and Pentium® III processors available from Intel Corporation of Santa Clara, Calif. Alternatively, other processors may be used. The processor 105 may include a first level (L1) cache memory (not shown in FIG. 1).

In one embodiment, the processor 105 is also coupled to a cache memory 107, which is a second level (L2) cache memory, via a dedicated cache bus 102. The L1 and L2 cache memories can also be integrated into a single device. Alternatively, the cache memory 107 may be coupled to the processor 105 by a shared bus. The cache memory 107 is optional and is not required for the computer system 100.

A chip set 120 is also coupled to processor bus 110. Included in the chip set is an Integrated Device Electronics (IDE) controller. A main memory 113 is coupled to the processor bus 110 through the chip set 120. The main memory 113 and the cache memory 107 store sequences of instructions that are executed by the processor 105. In one embodiment, the main memory 113 includes a dynamic random access memory (DRAM); however, the main memory 113 may have other configurations. The sequences of instructions executed by the processor 105 may be retrieved from the main memory 113, the cache memory 107, or any other storage device. Additional devices may also be coupled to the processor bus 110, such as multiple processors and/or multiple main memory devices. The computer system 100 is described in terms of a single processor; however, multiple processors can be coupled to the processor bus 110. A video device 125 is also coupled to the chip set 120. In one embodiment, the video device includes a video monitor such as a cathode ray tube (CRT) or liquid crystal display (LCD) and necessary support circuitry.

The processor bus 110 is coupled to a system bus 130 by the chip set 120. In one embodiment, the system bus 130 is a Peripheral Component Interconnect (PCI) standard bus; however, other bus standards may also be used. Multiple devices, such as an audio device 127, may be coupled to the system bus 130. A bus bridge 140 couples the system bus 130 to a secondary bus 150. In one embodiment, the secondary bus 150 is an Industry Standard Architecture (ISA) bus; however, other bus standards may also be used, for example an Extended Industry Standard Architecture (EISA). A hard drive 153 may be coupled to the secondary bus 150. Other devices, such as cursor control devices (not shown in FIG. 1), may be coupled to the secondary bus 150.

Figure 4:
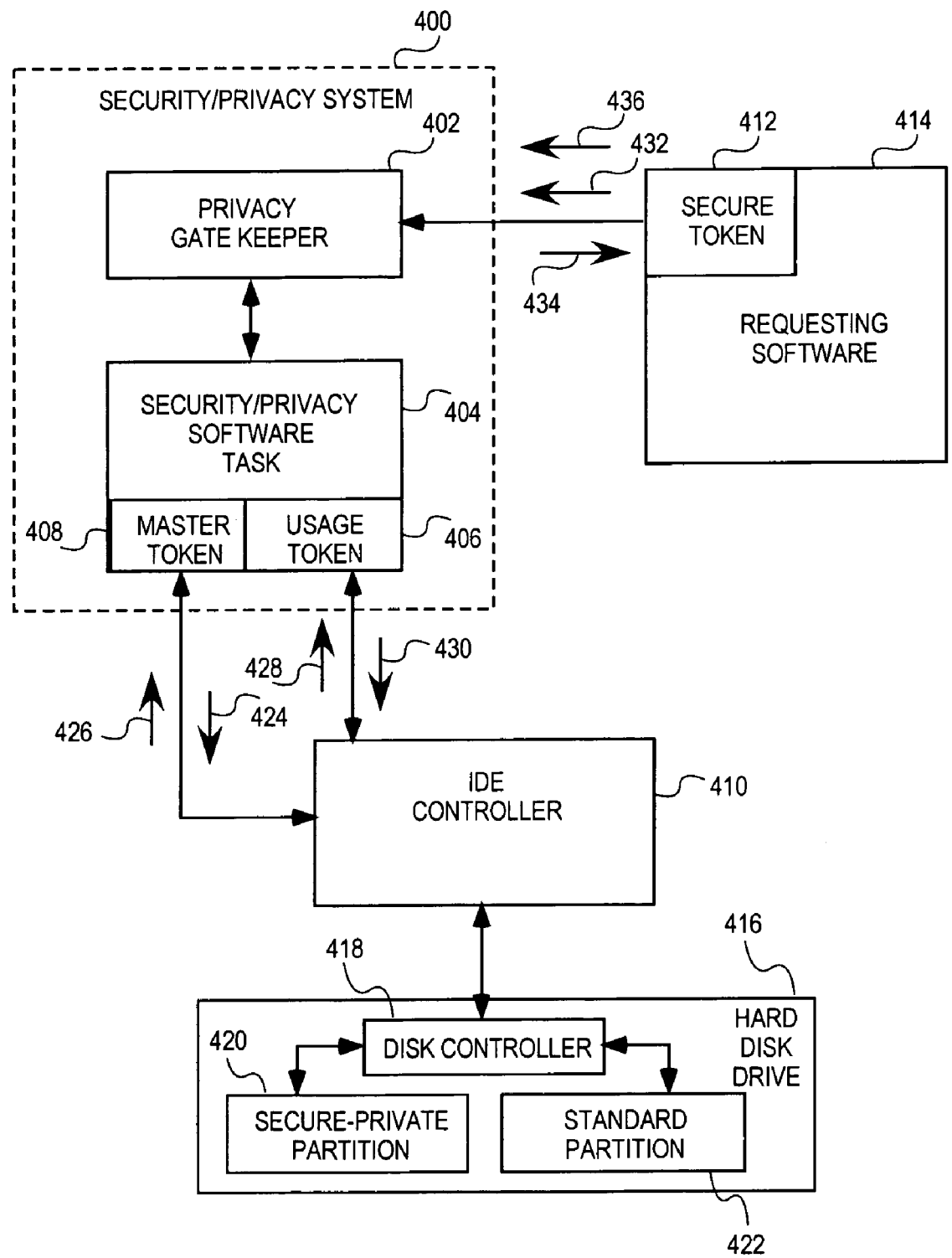
FIG. 4 is a block diagram of a security/privacy system according to one embodiment of the present invention.

Referring to FIG. 4, a block diagram of a security/privacy system 400 according to one embodiment of the present invention is shown. In the illustrated embodiment, the security/privacy system 400 includes a privacy gatekeeper 402 and a security/privacy software task 404. Also illustrated in FIG. 4 is an IDE controller 410, which provides for the attachment of IDE compatible storage devices such as a hard disk drive 416. The hard disk drive 416 includes a disk controller 418, which reside on the drive itself. The hard disk drive 416 is partitioned into a standard partition 422 and a secure-private partition (SPP) 420.

The SPP is operable in a locked mode and an unlocked mode, wherein the SPP is invisible to the operating system in the locked mode and the SPP is visible to the operating system in the unlocked mode. Normally, the SPP is hidden from the operating system until the partition is unlocked.

According to one aspect of the invention, the operations of the present invention relating to opening, accessing and closing of the SPP 420 are carried out in part by the IDE controller 410 which works in harmony with the disk controller 418 on the hard drive 416. Although an IDE controller is used in the illustrated embodiment, it should be understood by those skilled in the art that other types of controllers may be used for interfacing with the hard drive.

The SPP 420 is configured to unlock when a handshake is established between the IDE controller 410 and the security/privacy software task 404. The security/privacy software task 404 is a software or firmware (e.g., running at operating system privilege level) that is knowledgeable about the unlock handshake. In one embodiment, the security/privacy software task 404 requests a master token 426 from the IDE controller 410 when the computer is turned on for the very first time. This master token 426 is generated only one time by the IDE controller 410 and is required to unlock the SPP 420. The master token 426 could also be generated by the disk controller 418. The master token 426 issued by the IDE controller 410 or the disk controller 418 is stored in a secure storage location 408 for later use. The master token may be kept secure through any suitable security method for storage and subsequent use of the token, including encryption methods.

Also shown in FIG. 4 is a requesting software 414, which is a code that needs to access the SPP. When the requesting software 414 makes a request to access the SPP, the privacy gatekeeper 402 acts as a gatekeeper to the security/privacy software task 404. In this regard, the privacy gatekeeper will prescreen the request by validating a handshake (e.g., a secure token). Thus in order to initiate the process of accessing the SPP, the requesting software 414 will retrieve (or generates) a secure token 412 that is required by the privacy gatekeeper 402. The requesting software 414 makes a function call to the privacy gatekeeper 402 with the secure token 412 as one of the parameters to the function call. If the privacy gatekeeper 402 validates the handshake from the requesting software by verifying the secure token 432, it will return a unique access token 434 to the requesting software 414 for subsequent access. This validation by the privacy gatekeeper 402 causes the security/privacy software task 404 to send the master token 424 to the IDE controller 410 to unlock (i.e., make visible) the SPP. The master token from the security/privacy system is in turn validated by the IDE controller to ensure that it is the proper master token to unlock the SPP.

In accordance with another aspect of the invention, several different levels of security may be provided. In one embodiment of the present invention, the SPP may be configured to be private only. In this embodiment, when the SPP is unlocked, the partition is visible to the operating system and is generally accessible by other software. To prevent other software from accessing the SPP, the SPP is preferably locked back up once a series of (e.g., read/write) access thereto has been completed. The locking of the SPP upon completion of the access reduces the risk of damages to the partition content caused by an intentional act (e.g., repartition and format) or a malicious act (e.g., computer viruses). The locking of the SPP will be discussed in detail with reference to FIG. 3.

In another embodiment of the present invention, the access to the SPP can be made secure by utilizing encryption techniques to prevent other software from accessing the SPP when it is unlocked. In this embodiment, the data stored on the SPP can be encrypted using standard encryption techniques through either software or hardware encryption or a combination. As a result, the encrypted data in the SPP is readable only when an access thereto is accompanied by a special "key" to decode the encrypted data.

In yet another embodiment of the present invention, the access to the SPP 420 is made secure by requiring that each access request (e.g., read/write) be accompanied with a proper handshake. As described above, the SPP 420 is configured to be locked (i.e., the partition is hidden) and unlocked (i.e., the partition is visible). In this embodiment, once the partition is unlocked, each access request to the SPP must be accompanied by a proper handshake. The IDE controller 410 generates and returns a usage token 428 to the security/privacy system upon unlocking the SPP. The usage token 428 is stored in a secure location 406 so that it can be used later to access the content of the SPP. When the requesting software 414 needs to execute memory access, the requesting software uses the unique access token 436, which it has received earlier, to execute an access to the SPP. More specifically, the requesting software 414 makes a function call to the privacy gatekeeper 402 with the unique access token 436 as one of the parameters to the function call. The security/privacy software task 404 will in turn send an access request accompanied by the usage token 430 to the IDE controller 410, upon validation of the access token 436 by the privacy gatekeeper. The IDE controller 410 will only grant requests to access the SPP 420 in the case when the request is accompanied by a proper usage token 430. Because a usage token 430 is required with every access request, it is not possible for any piece of software to read, write, and/or destroy data on the SPP even when the SPP is unlocked.

Referring to FIG. 2a, the general operations of requesting and storing master token according to one embodiment of the present invention is shown. In functional block 200, the security/privacy software task 404 responsible for managing a secure link for the SPP 420 requests a master token 426 from the IDE controller 410 (or disk controller 418) when the computer is turned on for the very first time. Then in block 205, the master token received from the IDE controller or the disk controller is stored in a secure storage location 408 for later use.

Referring to FIG. 2b, the general operations of opening the SPP according to one embodiment of the present invention is shown. It should be noted that the term "opening" of the SPP in the context of the present invention is used to describe the process of unlocking the SPP so that the SPP is visible to the operating system. In decision block 210, a determination is made whether an access to the SPP is needed. The need to access the SPP may be triggered by various reasons. For example, perhaps a user clicked on an icon requesting additional system diagnostics software to be executed which are stored on the SPP or the user may have requested that the standard OS image be refreshed from the backup image stored on the SPP. In this example, the act of user clicking on an icon causes the operating system to start a program or task associated with that icon. The task (referred as requesting software 414 in FIG. 4) is perhaps a code that knows that it needs to access the SPP and the access mechanism (e.g., handshake) that must occur for that interface to be opened.

When the requesting software 414 needs to access the SPP (decision block 210, YES), the requesting software retrieves (or generates) a secure token 412 that is expected by the privacy gatekeeper 402 and makes a function call to the privacy gatekeeper with the secure token as one of the parameters to the function call. Once the privacy gatekeeper 402 has validated the handshake from the requesting software 414, the security/privacy software task 404 retrieves the master token from the secure storage location 408 in functional block 215. Then in functional block 220, the security/privacy software task 404 requests an open access to the SPP by making a function call to the IDE controller with the master token as one of the parameters. In order to validate whether it can continue with the command to open the private partition, the IDE controller validates the master token. The IDE controller passes the master token through it's internal hash mechanism and compares the result to verify that it is a valid token.

If the handshake is validated (decision block 225, YES), the IDE controller unlocks the SPP in block 230, causing the partition to be visible to the operating system. Then in functional block 235, the IDE controller 410 generates and returns a new usage token 428 to the security/privacy software task 404 for subsequent access to the SPP. In one embodiment, the privacy gatekeeper 402 may pass the new usage token 428 to the requesting software 414 for subsequent access. In an alternative embodiment, the requesting software may receive a new usage token directly from the IDE controller for subsequent access to the SPP. Because the usage token 428 is required to gain access (e.g., read/write) to the SPP, only a software having access to the usage token will be granted read/write access. In this regard, although the SPP is generally available to other software when it is unlocked, the usage token serves to prevent unauthorized access to the SPP. In the example where the requesting software is a software requesting additional system diagnostics software to be executed which are stored on the SPP. In this example, the requesting software will use the usage token in subsequent series of calls to find, open and run the diagnostic software that has been previously stored on the SPP. According to one aspect of the present invention, multiple usage tokens may be assigned to allow access to different portions of the SPP. In this regard, the SPP may be further partitioned into multiple sub-partitions. A security stack may be used to generate a new usage token for each sub-partition. In this regard, the security stack will issue a usage token to a software program that has initiated the unlock sequence for a particular sub-partition. In this regard, each software program having access to the SPP may use its usage token to gain access only to that particular sub-partition, however that usage token will not allow access to the rest of the SPP.

In one embodiment, the new usage token is implemented by the software writing the initial handshake token to a defined input/output port and then reading back the usage token. Then, the requesting software 414 executes read/write requests in functional block 240 and closes the access to the SPP in functional block 245, the details of which will be discussed with reference to FIG. 3. If the handshake is not validated (decision block 225, NO), the IDE controller will not unlock the SPP (i.e., the SPP will remain hidden from the rest of the computer system) and the system returns to decision block 210.

Any requests to the IDE controller to determine disk characteristics (e.g., number of partitions, type of partition, partition initialization, etc) will not return any valid information about the SPP unless it has been unlocked by submitting a valid master token with the request. Under general circumstances, operating systems and their associated device drivers for hard disks will not pass any sort of token to the IDE controller. Virus software or errant software may pass a token to the IDE controller, but the worst thing that could happen is that such software will keep the IDE controller busy rejecting requests as the rogue software tries all possible number combinations of a potentially large access token (e.g., perhaps 40-bit or 128-bit tokens may be used). In one embodiment, the IDE controller may be made intelligent so that after seeing a predetermined number of invalid requests since the last power cycle, the IDE controller disables all access to the SPP or the entire hard drive in recognition of an attempt by the unscrupulous software to gain unauthorized access. In this case, a flag indicating the number of invalid accesses would be reset when the power is turned off. The chances of errant or virus software gaining access to the SPP is limited by the computer system's ability to churn through number permutations but also by a time factor—it would take a rather long time (e.g., one million years) for a software to run through all possible numbers of a 128-bit token when the power must be cycled off-on after a certain amount of invalid attempts (e.g., 10).

Figure 2:
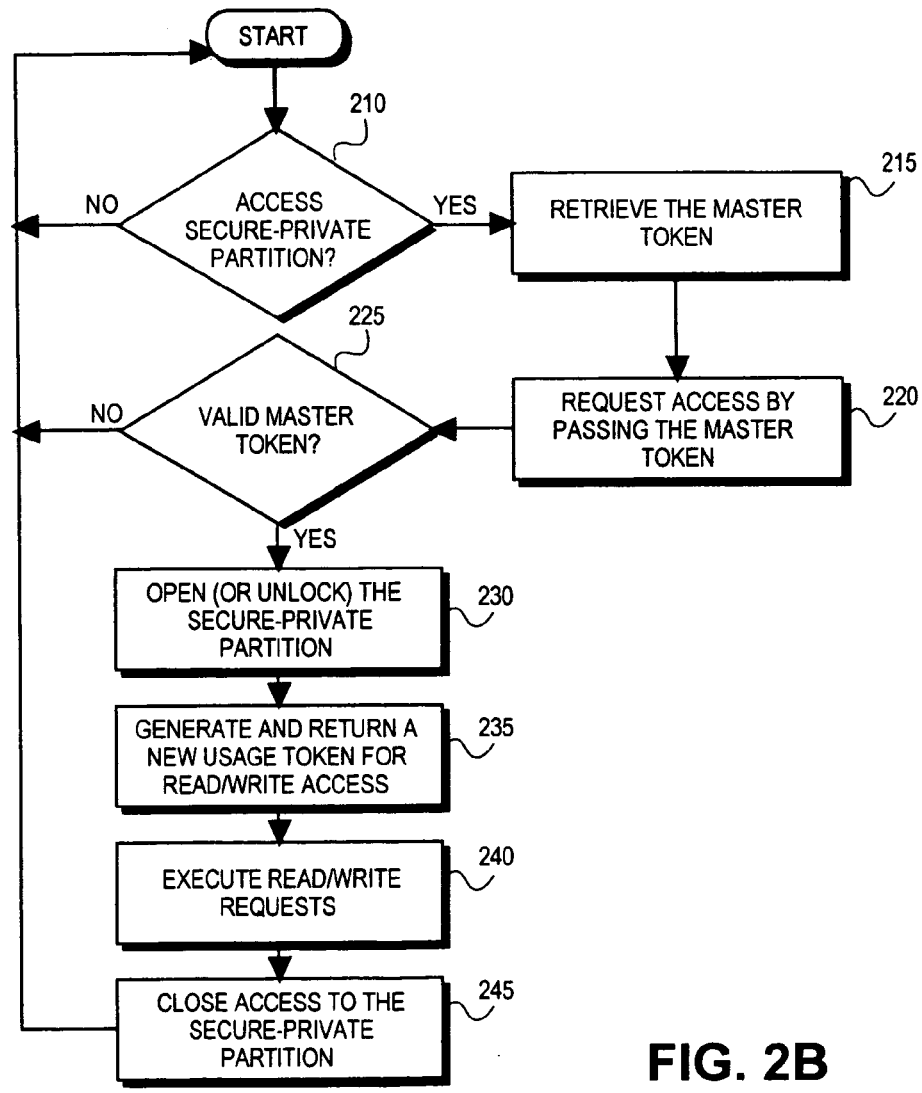
FIG. 2a is a flowchart of operations for requesting and storing master token according to one embodiment of the present invention.
FIG. 2b is a flowchart of operations for opening a secure-private partition of a hard drive according to one embodiment of the present invention.
Figure 3:
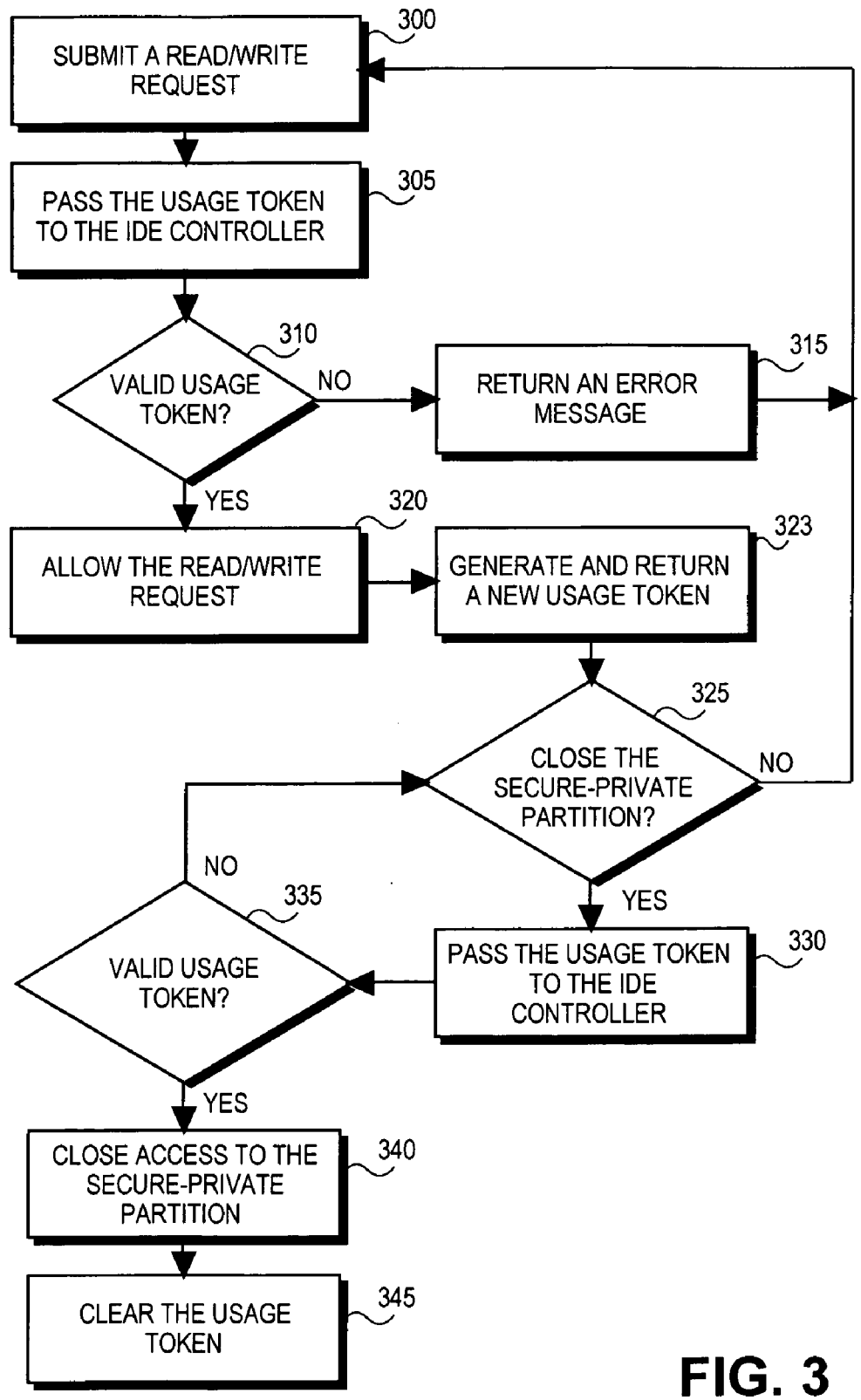
FIG. 3 is a flowchart of operations for reading/writing data to/from the secure-private partition according to one embodiment of the present invention.

Referring to FIG. 3, an expanded flowchart of functional blocks 240 and 245 of FIG. 2 is shown, illustrating the general operations of performing read/write requests and closing of the SPP according to one embodiment of the present invention. The software's request to read/write data to/from the SPP can be user initiated by selecting an application menu, clicking on an icon, starting the computer or other user-initiated actions. Alternatively, the software's requests to read/write data to/from the SPP can also be automatically generated without user intervention such as when local storage of a background process exceeds available RAM and needs mass storage, or when additional execution code for a background task needs to be loaded from the private partition.

After the SPP has been opened, the usage token may be available to the security/privacy software task 404. Alternatively, the usage token may be available to the requesting software 414 for directly communicating with the IDE controller 410. In this case, the requesting software 414 submits a read/write request for data stored in the SPP in functional block 300. Then in functional block 305, the requesting software 414 passes the usage token (directly or via the security/privacy system 400) to the IDE controller 410 since every read/write access request to the SPP must be accompanied by a proper usage token to be successful. Then in decision block 310, a determination is made for every read/write request by the IDE controller whether the usage token passed in by the requesting software is valid before continuing with the request. If the usage token is valid (decision block 310, YES), the request is granted, allowing the requesting software to perform read/write operations on the SPP in functional block 320. The usage token should be frequently changed to optimize security. In the illustrated embodiment, the IDE controller generates and returns a new usage token after each read/write access in functional block 323. If the usage token is invalid (decision block 310, NO), access to the SPP is denied and an error is returned to the requesting software using a well-known error return code in functional block 315.

When the requesting software (such as the application program which requested the usage of the SPP) has completed it's read/write access and would like to close the SPP (block 325, YES), it passes the usage token down through the same software path down to the IDE controller in functional block 330. It should be noted that the term "closing" of the SPP in the context of the present invention is used to describe the process of locking the SPP so that the SPP is hidden from the operating system. Then in decision block 335, the IDE controller again validates the usage token. If the usage token is valid (block 335, YES), the SPP is locked in functional block 340, meaning that the partition is hidden from the rest of the computer system (e.g., operating system). Then in functional block 345, the usage token gets clears out. After the SPP has been properly locked, subsequent requests to access the SPP, even with the last known usage token will be denied until the SPP is opened or unlocked by using the master token as previously mentioned with regard to blocks 210–230 of FIG. 2.

In yet another embodiment of the invention, additional security feature may be incorporated into the hard drive 416 itself such that the access to the SPP 420 will only be granted by the hard drive 416 if a proper handshake is established between the disk controller 418 and the IDE controller 410. Various techniques can be used to implement a handshake between the IDE controller 410 and the disk controller 418. For example, a handshake connection between the IDE controller and the hard disk controller is accomplished by new definitions of redundant ground pins on an IDE interface connector. For example, a handshake may be established when the handshake enables a certain pin on the IDE interface connector to be grounded. This handshake may be executed a program to set a certain pin on the IDE interface connector to ground. In another embodiment, a handshake connection between the IDE controller and the hard disk controller is accomplished by strobing all address and data lines high, followed by a handshake token passed through the data lines with the address lines pulled low.

The SPP formed in accordance with the present invention may provide a number of advantages. For example, the SPP may serve as an expansion memory for platform expansion functions, storing enhancements to standard firmware functions. If new functions need to be added to system firmware and there is no more nonvolatile storage available, the system ROM can be segmented to load additional feature code from the SPP of the hard disk by initiating the handshake between the system chipset and the controller on the hard drive. In this regard, computer systems may continue to expand platform functions without having to increase the size of system's flash or other nonvolatile memory. In addition, the secure/private may provide a static/semi-dynamic storage for functions that are normally kept in system ROM (nonvolatile system memory). The SPP can also used to contain software files that will never be updated, such as encryption software or other data that should be protected from computer viruses or mishap at all costs.

Alternatively or in addition to above stated purposes, the SPP may be used to store codes that are associated with, for example: (1) reinitializing platform to standard IT configuration; (2) diagnostics—if the system crashes or there is a hardware failure, diagnostic code can be loaded from this partition to analyze and possibly repair the system; (3) extended firmware functions; (4) secure content validation; (5) user authentication; (6) encryption/decryption; (7) freeze dried operating system image; (8) MPEG (Moving Pictures Experts Group) functions or other multimedia functions with universal decode interface; and (9) any other static functions that normally are stored in flash memory. The freeze dried operating system image is useful in the case where through accident or malice, the software on the hard drive is damaged such that the operating system will no longer load. In this case, the system firmware can be invoked through a special command (e.g., a special keystroke) to restore the hard disk image from the SPP.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A method comprising:
providing a partition on an Integrated Device Electronics ("IDE") storage device of a computer system, wherein said partition is invisible to an operating system of the computer system unless the partition is unlocked;
providing a software task having knowledge about an unlock handshake between the software task and an IDE controller,
performing the unlock handshake including an alteration of an electrical signal on an IDE controller interface line; and
unlocking the partition in response to an unlock request received from the software task after the software task performs the unlock handshake to unlock the partition, wherein the partition is visible to the operating system when unlocked.

2. The method of claim 1, wherein the storage device is a hard disk drive having an IDE disk controller.

3. The method of claim 1, wherein the software task requests a master token from the IDE controller when the computer system is first turned on and the unlock handshake between the software task and the IDE controller further comprises:
passing the master token back to the IDE controller as a parameter.

4. The method of claim 2, wherein the software task requests a master token from the disk controller when the computer system is first turned on, said master token to be used by the software task to initiate the unlock handshake to unlock the partition.

5. The method of claim 1, wherein the software receives a usage token from the IDE controller when the partition is unlocked and the unlock handshake between the software and the IDE controller includes passing the usage token back to the IDE controller as a parameter.

6. The method of claim 1, further comprising:
locking the partition in response to a lock request received from a software task having knowledge about a lock handshake for locking the partition.

7. The method of claim 1, further comprising:
providing a standard partition on the storage device, wherein said standard partition is always visible to the operating system and generally accessible to other software.

8. The method of claim 1, further comprising:
preventing an access to the partition when the partition is unlocked unless the access is requested by a software that performs another handshake for accessing the partition.

9. A machine-readable medium that provides instructions, which when executed by a set of processors, causes said set of processors to perform operations comprising:
receiving an open request from a software task to access a secure-private partition on an IDE hard drive of a computer system;
validating the open request received from the software task;
requesting unlocking of the secure-private partition in response to the validation of the open request received from the software task;

unlocking the secure-private partition in response to the unlocking request such that the partition that was previously invisible to an operating system becomes visible to the operating system; and causing an IDE controller to prevent access to the secure-private partition when the secure-private partition is locked unless the access is requested by a software task having knowledge about an unlock handshake for accessing the secure-private partition, the unlock handshake to include altering an electrical signal on an interface line of the IDE controller, the electrical signal to cause the operating system to be granted access to the partition.

10. The machine-readable medium of claim 9, wherein the operations further comprise requesting locking of the secure-private partition in response to a close request received from the software.

11. The machine-readable medium of claim 9, wherein the requesting of the unlocking of the secure partition further comprises:

requesting a master token from an IDE controller when the computer system is turned on;

storing the master token in a secure storage location;

retrieving the master token from the secure storage location when an access to a secure-private partition is needed; and passing the master token as a parameter to the IDE controller.

12. The machine-readable medium of claim 9, wherein the operations further comprise requesting an access to the secure-private partition in response to an access request received from the software.

13. The machine-readable medium of claim 12, wherein requesting access to the secure partition further comprises:

receiving a usage token; and passing the usage token to the IDE controller to gain an access to the secure partition.

14. The machine-readable medium of claim 9, wherein the request from the software to access the secure-private partition is received by a privacy gatekeeper which pre-screens the request to determine if the software has an authorization to access the secure-private partition.

15. A method comprising:

partitioning a hard disk into a standard partition and a secure-private partition (SPP), the SPP operable in a locked mode and an unlocked mode;

switching the SPP from the locked mode to the unlocked mode in response to a handshake, the handshake including altering an electrical signal on an IDE controller interface line causing the partition to be unlocked;

receiving at least one read/write request from a requesting software program; and switching the SPP from the unlocked mode to the locked mode in response to a close request; wherein each of the at least one read/write requests is accompanied by a usage token.

16. The method of claim 15 wherein the handshake comprises:

receiving a secure token from a requesting software program;

verifying the secure token; and returning the usage token to the requesting software program.

17. The method of claim 15, further comprising:

validating the usage token received with a read/write request, and, if the token is valid, performing the request; or if the token is invalid, denying the request.

18. The method of claim 15, further comprising:

generating a new usage token after the read/write request; and returning the new usage token to the requesting software program.

19. A system comprising:

a first token;

a hard disk drive including a disk controller and a secure-private partition;

a handshake connection to toggle the secure-private partition between visible mode and invisible mode;

an Integrated Drive Electronics (IDE) controller to initiate the handshake connection between the IDE controller and the disk controller upon receipt of the first token, the handshake connection including alteration of an electrical signal between the IDE controller and the disk controller.

20. The system of claim 19 further comprising:

a requesting software task to request access to the secure-private partition.

21. The system of claim 20 wherein an operating system is to launch the requesting software task.

22. The system of claim 19 wherein the IDE controller is to validate the first token before initiating the handshake connection.

23. The system of claim 22 wherein the IDE controller is to validate the first token by passing the first token through an internal hash mechanism.

24. The system of claim 19 wherein the system includes handshake logic to strobe address and data lines high and to pass a second token through the data lines with the address lines pulled low.

25. The system of claim 22 wherein the secure-private partition is to remain in invisible mode if the first token is invalid.

* * * * *